United States Patent [19]

Dowler

[11] Patent Number: 4,915,130

[45] Date of Patent: Apr. 10, 1990

[54] REVOLVING FUEL PICK-UP TUBE

[75] Inventor: Robert L. Dowler, New Haven, Ind.

[73] Assignee: Navistar International Transportation Corp., Chicago, Ill.

[21] Appl. No.: 263,110

[22] Filed: Oct. 26, 1988

[51] Int. Cl.⁴ ............................................. F16L 27/08
[52] U.S. Cl. .................................... 137/579; 137/580; 137/590; 137/615
[58] Field of Search ................... 137/44, 45, 577, 580, 137/590, 615, 579; 285/272; 184/6.2

[56] References Cited

U.S. PATENT DOCUMENTS

| | | | |
|---|---|---|---|
| 1,871,055 | 8/1932 | Hasbrouck | 137/38 X |
| 2,112,393 | 3/1938 | Burch et al. | 137/577 |
| 2,415,972 | 2/1947 | Stinson | 137/38 X |
| 2,446,612 | 8/1948 | Sauser et al. | 244/135 R |
| 2,578,000 | 12/1951 | Cronk | 137/590 X |
| 2,662,538 | 12/1953 | Cervino et al. | 137/577 X |
| 2,740,563 | 4/1956 | Jackson | 137/45 X |
| 2,765,866 | 10/1956 | Carroll, Jr. et al. | 137/45 X |
| 3,011,504 | 12/1961 | Klank, Jr. | 137/577 X |
| 3,461,877 | 8/1969 | Morch | 285/272 X |
| 3,592,293 | 7/1971 | Frincke | 184/6.2 |
| 3,627,078 | 12/1971 | Burrous | 137/44 |
| 3,948,283 | 4/1976 | Asfura et al. | 137/590 X |
| 4,702,276 | 10/1987 | Bouteille et al. | 137/580 |

FOREIGN PATENT DOCUMENTS 656 of 1906 United Kingdom ................ 137/615

Primary Examiner—John Rivell
Attorney, Agent, or Firm—F. David AuBuchon; Dennis K. Sullivan

[57] ABSTRACT

A fuel feed line having a swivel supported horizontal pick-up tube to draw fuel from the fuel tank where the fuel is of maximum depth. The depth of fuel in the tank may vary due to gravitational or centrifugal forces acting on the fuel.

1 Claim, 1 Drawing Sheet

REVOLVING FUEL PICK-UP TUBE

This invention relates to a fuel line and more particularly to a swivel supported horizontal fuel pick-up tube which moves with the flow of fuel where fuel is of maximum depth. The movement of fuel is caused by centrifugal forces or gravitational force acting on the fuel and the swivel supported pick-up fuel tube assures continuous flow of fuel into the pick-up tube since the forces of the fuel acting on the pick-up tube cause it to move to the fuel of maximum depth.

Current fuel tanks generally use a fixed vertical fuel pick-up tube which draws fuel near the bottom of the fuel tank. The problem associated with this type of pick-up tube is that when the fuel level is relatively low and the vehicle is ascending, descending or on a side grade or is rapidly negotiating a turn, the fuel is pulled away from the pick-up tube by either gravity or centifugal force. Accordingly, the pick-up tube may draw air and cause the engine to stall. Accordingly, a means for providing fuel at the inlet of the pick-up is necessary.

The U.S. Pat. No. 2,740,563, Jackson shows a pick-up tube which is designed to overcome this problem. The pick-up tube is pivoted on it's supporting end and has a weight which pivots the pick-up tube due to centrifugal force or to gravity and accordingly improves the operation of the fuel line. This does not however cover all circumstances in which the fuel has shifted to a different position in the fuel tank. This pivots on a single horizontal axis and does not allow for fuel which may shift in a direction in which the pivoting axis of the pick-up tube can accommodate.

The U.S. Pat. No. 1,871,055, Hasbrouck also shows a device for pick-up of fuel on an airplane. The pick-up tube has a weight on the end which is designed to move with the fule and always provide fuel pick-up regardless of whether the plane is turning upside down or otherwise. This device also provides for a secondary tank in which the fuel is supplied and from this secondary tank the engine fuel line is connected.

The applicant has provided for a vertical fuel line having a swivel supporting horizontal pick-up tube. The pick-up tube also carries a wing which is moved by the flow of fuel responsive to centrifugal or gravitational forces. This causes the inlet end of the pick-up tube to always be in the area of the fuel tank where the fuel is of maximum depth. Accordingly, it is believed that the applicants invention is distinguishable over the prior two references cited.

It is an object of this invention to provide a fuel line for an internal combustion engine with the fuel inlet designed to move to the fuel of greatest depth which is caused by gravity or centrigual forces acting on the fuel.

It is another object of this invention to provide a swivel supported fuel pick-up tube mounted on a fuel line to assure continuous fuel flow through the fuel line.

It is a further object of this invention to provide a vertical fuel line in a fuel tank carrying a swivel supported horizontal pick-up tube which pivots with the flow of fuel to assure continuous fuel pick-up even though the fuel shifts in the fuel tank.

It is a further object of this invention to pivotally support a horizontal pick-up tube having a vane sensing fuel flow to assure continuous fuel pick-up by positioning the fuel inlet at a point in the fuel tank of greatest fuel depth.

The objects of the invention are accomplished in the fuel line of a fuel tank with a vertical fuel tube aligned centrally in the fuel tank. A swivel supported horizontal pick-up tube is mounted on the lower end of the vertical fuel line. A vane on the horizontal tube causes the horizontal tube to rotate with fuel flow responsive to centrifugal and gravitational forces to maintain the pick-up inlet to move to the fuel of greatest depth in the fuel tank.

Figure 1:
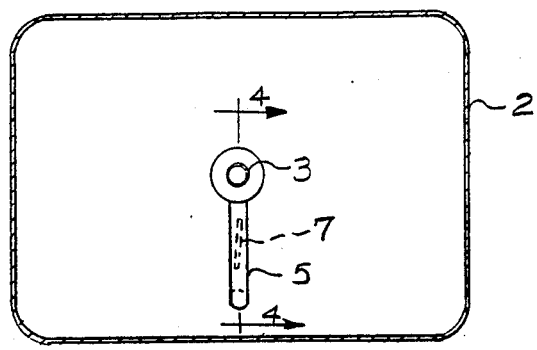
FIG. 1 is a plan view of the fuel tank and fuel pick-up device.
Figure 2:
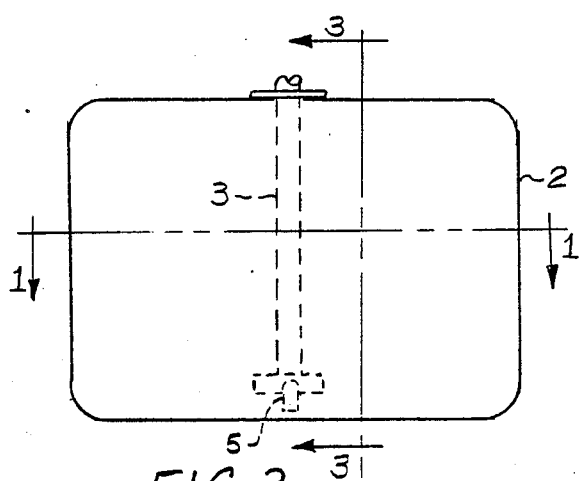
FIG. 2 is a side elevation view of the fuel tank and fuel pick-up device.
Figure 3:
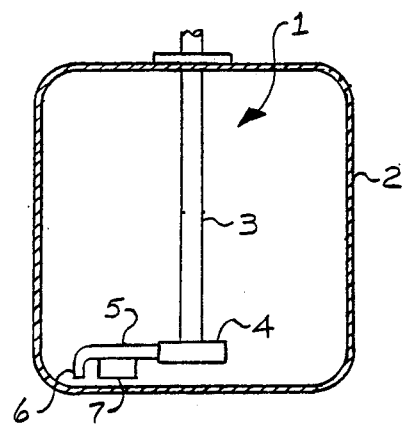
FIG. 3 is an end elevation view of the fuel tank and fuel pick-up device.

Referring to the drawings the preferred embodiment of this invention is illustrated. The fuel line 1 is mounted in the fuel tank 2 and extends downwardly from the top of the tank. The vertical tube 3 supports a swivel 4. The swivel is connected to the horizontal pick-up tube 5 which has a depending end 6 forming the inlet for the pick-up tube. The swivel 4 freely pivots 360 degrees on the lower end of the vertical fuel tube 3. This allows the pick-up tube 5 to rotatein any direction. The wing 7 is affixed to the bottom side of the pick-up tube above the end of depending end 6 and is positioned at a slight angle to the pick-up tube so that any movement of fuel in the tank will cause the pick-up tube to rotate and it will rotate in the direction of the fuel flow in the tank. It will automatically move to a position of the greatest depth of fuel in the ank. The swivel 4 may be any suitable arrangement necessary to accommodate pivoting of the pick-up tube. It may be provided with an anti-friction bearing allowing it to freely pivot in any direction responsive to the fuel flow in the tank. Also a polyteraflouroethylene sleeve may be used which would provide continuous passage between the vertical fuel tube 3 and the horizontal pick-up tube 5. Accordingly, fuel flow through the pick-up tube and the vertical fuel tube 3 would supply the fuel line to an internal combustion engine. A polytetraflouroethylene sleeve, such as sold under the name Teflon, would have very low friction and would allow pivotal movement and the sleeve could be adapted to provide continuous passage between the pick-up tube and the vertical fuel tube 3.

Figure 4:
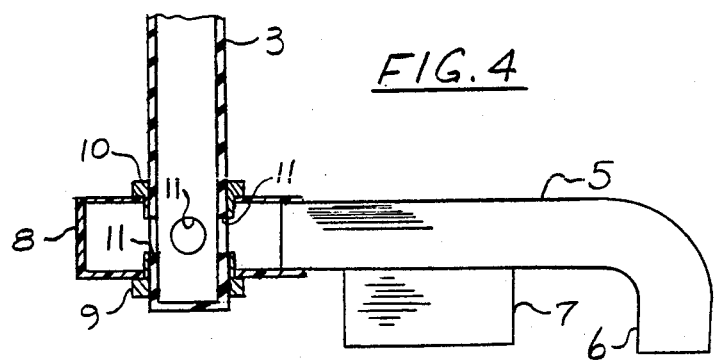
FIG. 4 is an enlarged view of the swivel in the fuel line.

FIG. 4 is an example how this arrangement could be made with a polytetraflouroethylene sleeve. A sleeve 8 would be fitted on the vertical fuel tube 3 and carried by a nut 9. A sleeve would also be held in position by a second nut 10 and a washer and seal to allow the sleeve 8 to rotate freely on the lower end of the vertical fuel tube 3. The sleeve 8 would be provided with radial openings 11 around the vertical fuel sleeve 3 to accommodate flow of fuel from the horizontal pick-up tube 12 to the vertical fuel tube 3. The exact construction is not of great significance, however, the swivel must be able to freely rotate on the bottom end of the vertical fuel tube 3. This will allow the pick-up tube 12 to rotate 360 degrees and move to the position of greatest fuel depth in the fuel tank.

The device operates generally in the following manner. As the fuel flows or shifts in the fuel tank, either by gravity or centrifugal force in any direction it will exert a force on the wing 6 which will cause the horizontal pick-up tube 3 to rotate and always be located in the maximum depth level of the fuel. By affixing the wing at a slight angle to the pick-up tube, even an exact 180 degree reversal of forces would cause a slight unbalance of force on the tube and therefore would rotate the pick-up tube to the new location of fuel. By designing the horizontal pick-up tube to the maximum length which would still allow a full 360 degree rotation, this would permit much greater angularity of the vehicle or speed in negotiating a turn with a maximum level of fuel in the tank for the pick-up tube.

I claim:

1. A fuel line pickup in a vehicle fuel tank comprising a vehicle fuel tank, a fuel line including a centrally mounted fuel tube in said fuel tank, a horizontal fuel pickup tube having a downturned portion terminating in a fuel inlet, a swivel carried on the lower end of said centrally mounted fuel tube supporting said fuel pickup tube for rotation about said centrally mounted fuel tube, means defining a sealed passage in said swivel for transferring fuel from said fuel pickup tube to said centrally mounted tube, and a wing mounted to the bottom side of said horizontal pickup tube and extending downwardly to a distal end disposed above said fuel pickup tube inlet, said wing being mounted slightly angular to said horizontal pickup tube thereby causing said fuel pickup tube to swivel responsive to fuel movement in said tank to move said fuel pickup to an area of greatest fuel depth in said tank.

* * * * *